Figure 1:
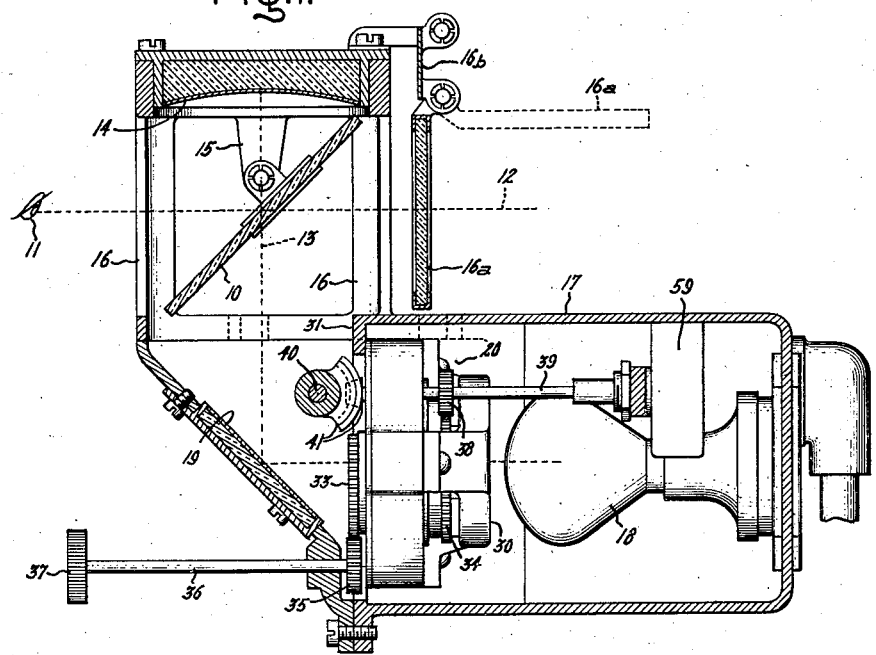

Sept. 3, 1946.    D. L. COLBATH    2,406,807
SIGHTING APPARATUS
Filed Dec. 17, 1943    4 Sheets-Sheet 1

Inventor:
Dan L. Colbath,
by Harry E. Dunham
His Attorney.

Inventor:
Dan L. Colbath,
by Harry E. Dunham
His Attorney.

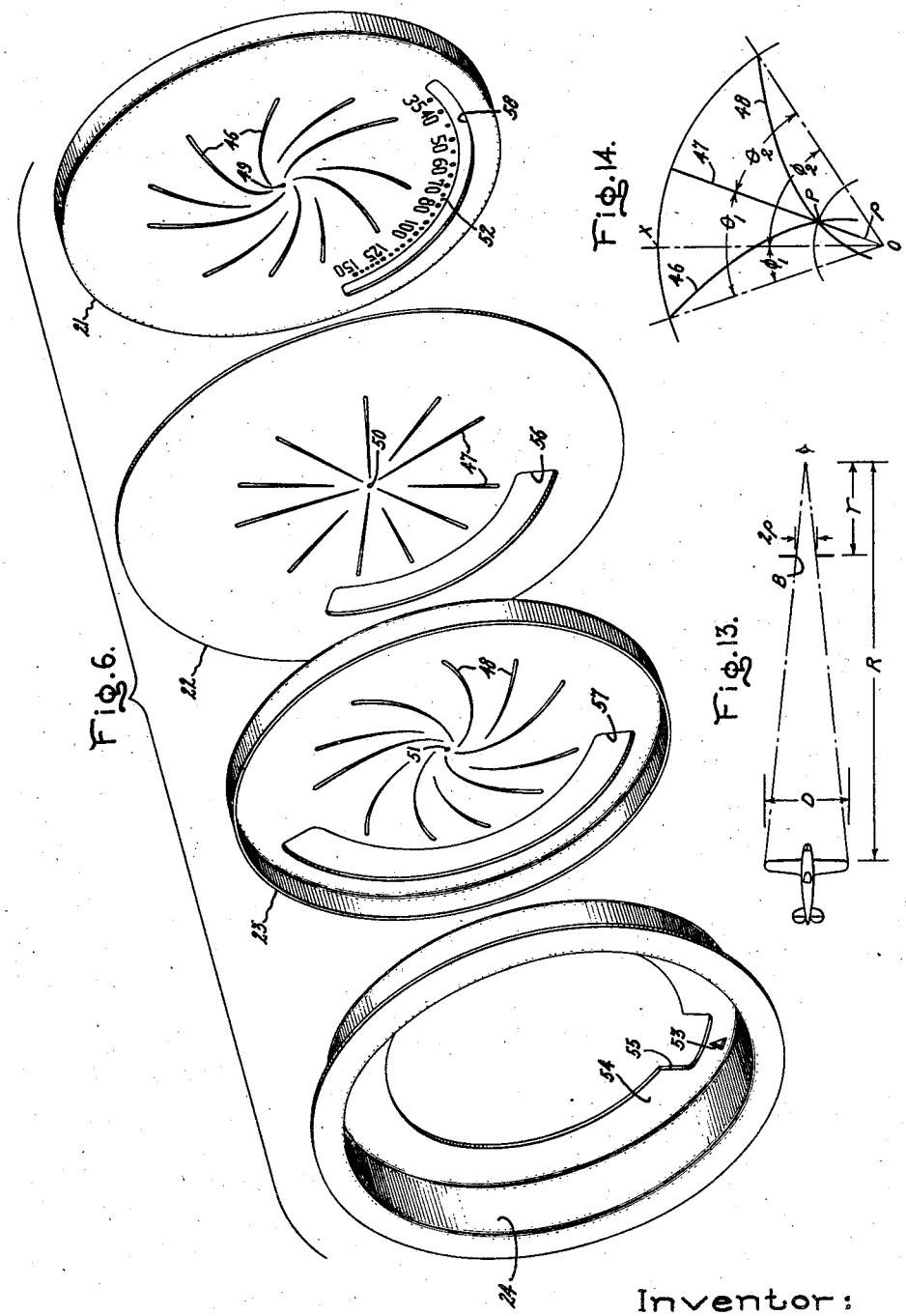

Sept. 3, 1946.    D. L. COLBATH    2,406,807
SIGHTING APPARATUS
Filed Dec. 17, 1943    4 Sheets-Sheet 4
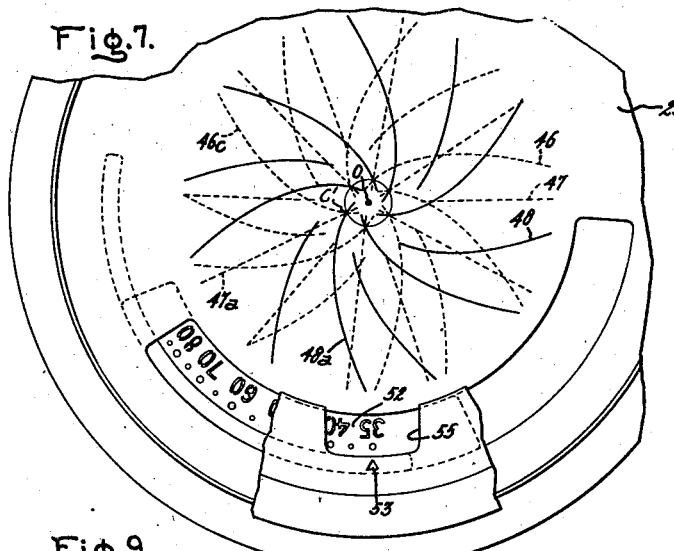
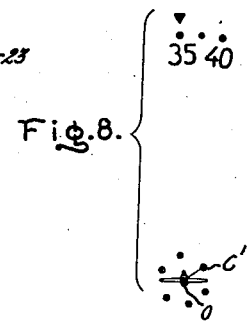
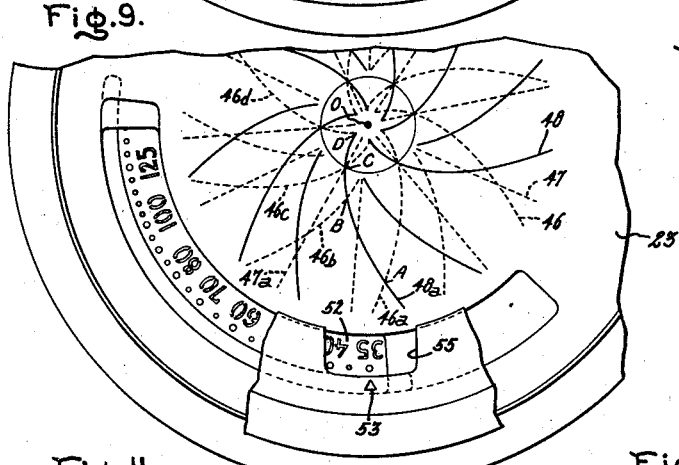
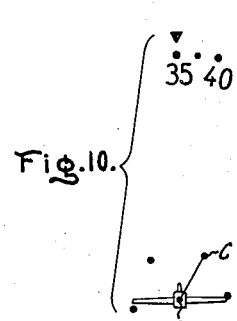
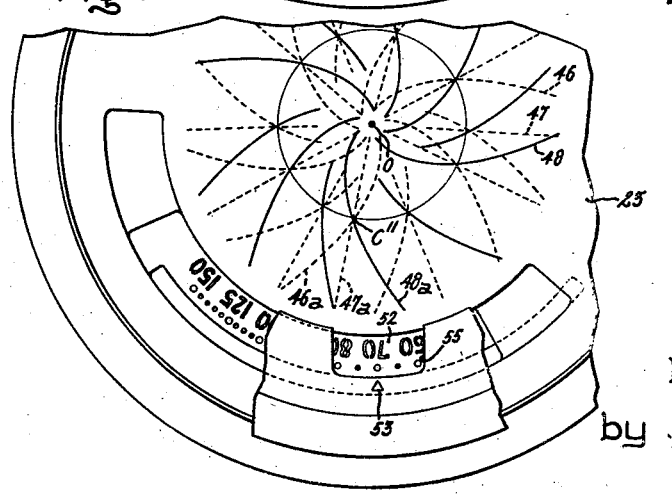
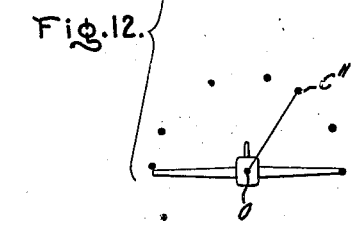
Inventor:
Dan L. Colbath,
by Harry E. Dunham
His Attorney.

Patented Sept. 3, 1946

2,406,807

UNITED STATES PATENT OFFICE 2,406,807

SIGHTING APPARATUS

Dan L. Colbath, Schenectady, N. Y., assignor to General Electric Company, a corporation of New York Application December 17, 1943, Serial No. 514,591

5 Claims. (Cl. 88—2.3)

This invention relates to sighting apparatus, more particularly to sighting apparatus which is especially useful as a stadia range finder.

Stadia range finders operate on the principle that the range of a distant target whose actual size is known may be determined by measurement of the angle the target subtends at the eye of the observer. The subtended angle is usually measured by superimposing upon the line of sight of the observer an image of a stadia figure the size of which may be adjusted to coincide with the known dimension of the observed target. When coincidence is obtained the size of the stadia figure bears a fixed relation to the subtended angle and target range, and hence adjustable means for varying the size of the stadia figure can be calibrated in terms of target range.

A stadia range finder is known which comprises a transparent member through which a target is observed. A collimating light-projecting system is provided which projects an image of a stadia figure so that it is reflected from the transparent member into the observer's line of sight where it appears as a virtual image at an infinite distance and effectively coincident with the observed target. Such an optical system is described and claimed in the copending application of Charles S. Grimshaw, Serial No. 443,031, filed May 15, 1942, and which application is assigned to the assignee of the present application.

The Grimshaw system includes a plurality of superimposed opaque stadia figure generating plates disposed between the source of light and the reflector and substantially in the focal plane of the collimating system. These plates have a series of light-conducting portions arranged to produce a luminous stadia figure formed of a plurality of points of light appearing at the intersections of the light-conducting portions of the plates. The light-conducting portions of the plates have a configuration such that the points of light are arranged in a circle, the diameter of which may be varied by a relative rotative movement of the plates.

A plurality of sets of cooperating masking plates are provided which are calibrated to determine the ranges of different sized targets; that is, a different set must be used for each different sized target.

This invention contemplates improvements in the Grimshaw apparatus, including an arrangement wherein a single set of masking plates can be used to determine the ranges of targets of any size between the upper and lower limits of target size for which the device is designed.

In accordance with this invention, in one embodiment thereof, there is a set of masking plates including two opaque plates which have intersecting spiral light-conducting portions. The points of intersection of these spiral portions define stadia range figures in the form of spaced dots of light arranged in concentric circles, the diameters of which may be varied by rotating the plates relative to each other. One plate is rotated in accordance with known target size, while the other is rotated in accordance with target range so that when the proper stadia circle coincides with the target, the target range is automatically determined. A third opaque plate is superimposed upon the other two and has a series of radial light-conducting portions. The plates are arranged so that these radial light-conducting portions pass through but one of the series of points of intersection of the spiral light-conducting portions of the other two plates that form the proper circular stadia range figure, the remaining points of intersection of these spiral light-conducting portions being masked out. This third plate is always moved through a fraction of the angle of divergence between the other two plates, as they are rotated to vary the size of the stadia figure, so that its radial lines always pass through the points of intersection of the chosen stadia figure.

Figure 2:
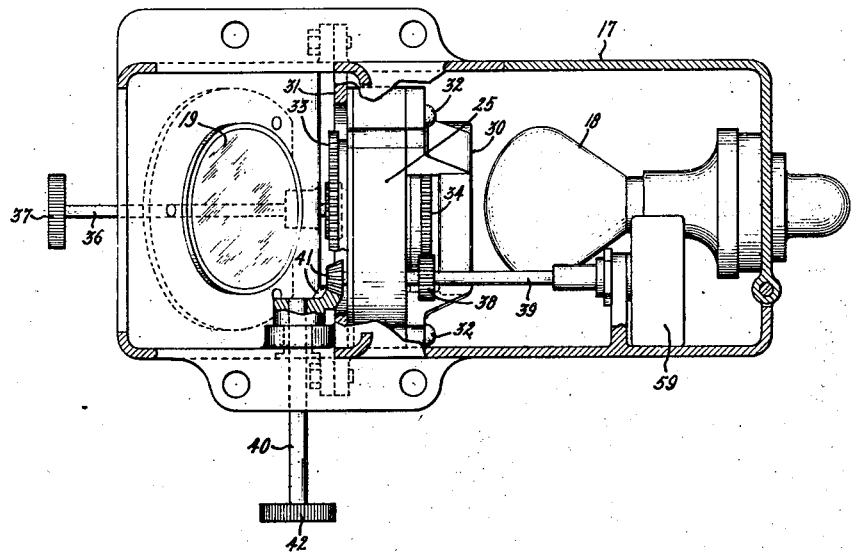
Figure 3:
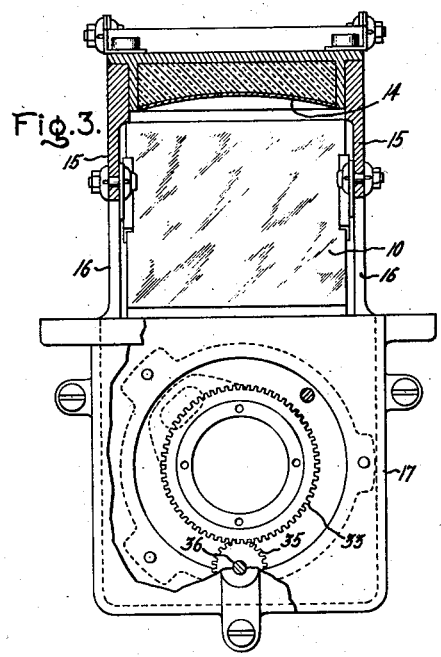
Figure 5:
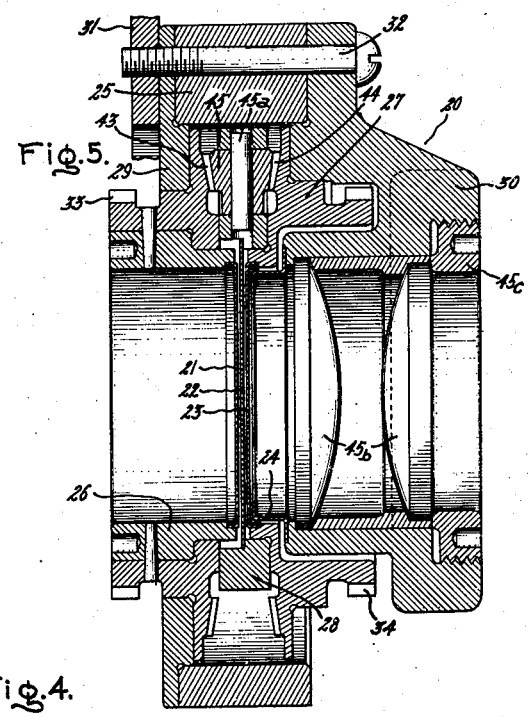
Figure 4:
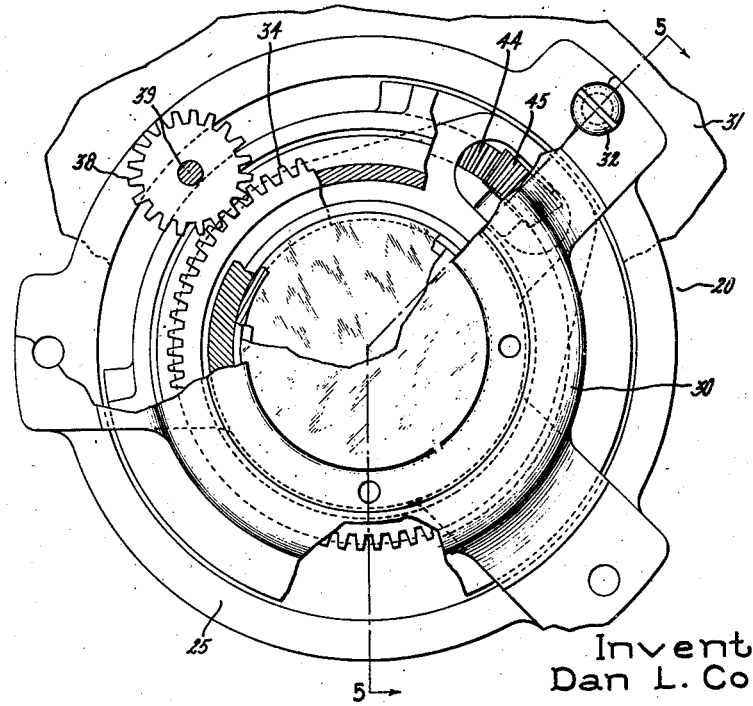

For a more complete understanding of this invention, reference should be had to the accompanying drawings in which Fig. 1 is a vertical sectional view taken through optical sighting apparatus embodying this invention; Fig. 2 is a horizontal sectional view taken through the apparatus shown in Fig. 1; Fig. 3 is a front elevation of the apparatus shown in Figs. 1 and 2, parts being shown in section and parts broken away so as to illustrate certain details of construction; Fig. 4 is an end elevation illustrating parts of the stadia figure generating apparatus used in this invention, parts being broken away and parts shown in section so as to illustrate certain details of construction, and the figure being drawn to a larger scale than Figs. 1, 2, and 3; Fig. 5 is a sectional view taken through the line 5—5 of Fig. 4 and looking in the direction of the arrows; Fig. 6 is an expanded view illustrating the plates and an associated member, this figure being drawn to a larger scale than the preceding figures; Fig. 7 is an enlarged view showing the relationship of the superimposed plates when adjusted for maximum target range for a given known minimum target size; Fig. 8 illustrates the manner in which the stadia figure generated by the plates shown in Fig. 7 appears to the observer; Fig. 9 is a view similar to Fig. 7 except that the plates are adjusted for a shorter range; Fig. 10 is a view similar to Fig. 8 except that the stadia figure is shown adjusted for the shorter range when the plates are in their positions shown in Fig. 9; Fig. 11 is a view similar to Figs. 7 and 9 except that it illustrates how the stadia circle is increased for a larger target size at the same range as in Fig. 9; Fig. 12 is a view similar to Figs. 8 and 10 except that it corresponds to Fig. 11; and Figs. 13 and 14 are diagrammatic views illustrating the principle of operation of the sighting apparatus.

Referring to the drawings, there is illustrated a stadia range finding apparatus arranged in accordance with this invention and comprising a transparent reflector 10 formed of glass or some other suitable material through which a distant target may be observed by an observer whose eye is positioned at 11. The plane of the transparent reflector 10 is disposed at an angle to the line of sight 12 so that an image of a range finding stadia figure projected along a line 13 to a collimating reflector 14, positioned above the reflector 10, and from there back along this line 13 to the member 10 is reflected from the surface of the reflector 10 into the eye of the observer where it appears as a virtual image superimposed upon the line of sight 12.

The reflector 10 is adjustably mounted upon a pair of brackets 15 supported by a framework 16. This framework also supports the collimating reflector 14, as shown. In addition, it supports a suitable light filter 16a pivotally mounted upon a bracket 16b for movement to a position in the line of sight 12, as shown in full lines in Fig. 1, to a position removed therefrom as indicated in dotted lines in this figure.

The unit including the reflector 10, the collimating reflector 14, the frame 16 and the filter 16a, is mounted upon a casing 17 arranged at right angles to the unit, as shown. Mounted within the right-hand end of the casing 17, as viewed in Figs. 1 and 2, is a source of light 18 which preferably will be an electric incandescent lamp; and at the other end of the casing there is a reflector 19 for directing the light rays from the lamp up along the line 13 through the transparent reflector 10 to the collimating reflector 14.

Interposed between the lamp 18 and the reflector 19 is a stadia figure generating apparatus 20 which is arranged to generate the stadia figure at the focal plane of the collimating reflector 14 whereby the projected image thereof appears to the observer to be at an infinite distance.

This apparatus comprises a set of three opaque disks or masking plates 21, 22 and 23, and an index plate 24, which members are shown more clearly in Figs. 5, 6, 7, 9 and 11. The assembly of these plates is mounted within a supporting ring 25 (Figs. 4 and 5). The plates 21 and 23 have a shallow pan-like shape and are mounted in the ends of the supporting ring members 26 and 27 respectively, while the third plate 22 is mounted in a ring member 28, all as shown more clearly in Fig. 5. The ring 26 is mounted to rotate in an end plate 29; the ring 27 is mounted to rotate in the opposite end plate member 30; while the ring 28 is mounted to rotate on the rings 26 and 27. The index plate 24 is secured to the inner end of the end plate 30.

The main supporting ring 25 and the two end plates 29 and 30 are secured together as a unit and this unit is secured to an inturned flange 31 mounted in the casing 17 by means of screws 32.

The rings 26 and 27 have spur gears 33 and 34 respectively attached thereto whereby they may be rotated. Meshing with the gear 33 is a pinion 35 mounted upon a shaft 36 which is journaled in the casing 17 and which projects to the exterior thereof, and which on its outer projecting end carries an adjustment knob 37. The gear 34 is driven by a pinion 38 which is mounted on a shaft 39 also journaled in the casing 17. This shaft is driven by means of a shaft 40 journaled in the casing 17 and positioned at right angles to the shaft 39, as shown. The shafts 39 and 40 are interconnected by means of bevel gears 41. And the shaft 40 projects from the casing, as shown, and on its outer end carries an adjustment knob 42. The ring 28 which supports the masking plate 22 is driven from the rings 26 and 27 through gears 43 and 44 formed on the two rings respectively and which mesh with a gear 45; this gear 45 is mounted to rotate freely upon a shaft 45a which is attached to the ring 28, as shown in Fig. 5. In the specific embodiment of the invention illustrated, the gearing is such that the ring 28 and hence the masking plate 22 always moves through one-half of the angle of divergence between the rings 26 and 27, and hence between the masking plates 21 and 23.

Mounted within the end plate 30 are a pair of light-collecting lenses 45b which function to collect the light from the lamp 18 and to project it onto the masking plates. These lenses, as shown, are secured in the end plate 30 by means of a screw plug 45c.

The three opaque masking plates 21, 22 and 23 are provided with series of light-conducting portions, which portions in the embodiment of the invention illustrated in the drawings, are in the form of slots cut through the plates. The plate 21 is provided with a series of radially-arranged spiral slots 46, the plate 22 with a series of straight radial slots 47, and the plate 23 with a series of radially-arranged spiral slots 48 having the same shape as slots 46 but being conjugate to or reversely arranged with reference to them. Each plate has the same number of light-conducting slots in its series, and in each, corresponding slots are spaced alike; and moreover, the slots in the three series are positioned radially with reference to circular slots 49, 50 and 51 provided in the three plates 21, 22 and 23 respectively and located in their axis of rotation.

In order to secure the desired degree of sensitivity in adjustment of the diameter of a circle formed by the intersecting points of the spiral slots and also for the purpose of securing sharp intersecting points so that the light-conducting areas will be small and well defined, the slots 46 and 48 have a relatively small radius of curvature; also it is desirable to use a relatively large number of slots 46 and 48 so as to provide a circular stadia figure in which the dots are relatively close together. Because a large number of slots having a small radius of curvature are used, a given spiral slot 46 or 48 in one of the plates 21 or 23 will intersect a number of the spiral slots in the other plate at a number of points spaced at different radial distances from the axis O of the plates, as shown in Figs. 7, 9 and 11. For example, the slot 48a (Fig. 9) of the plate 23 intersects slots 46a, 46b, 46c and 46d of the plate 21 at the points A, B, C and D at radial distances OA, OB, OC and OD from the central axis O. The remaining spiral slots 48 of plate 23 intersect other spiral slots 46 of plate 21 in a similar way, and therefore neglecting the effect of the third plate 22, there would be formed in the observer's field of view dots of light forming a series of concentric circles around the central dot of light which is formed by the passage of light through the central openings 49, 50 and 51. It will also be apparent that as the plates 21 and 23 are rotated relatively to each other these radii will continuously change. For example, the circle of dots with radius OC of Fig. 9, which forms the stadia figure shown in Fig. 10, will be reduced in diameter to generate the stadia circle shown in Fig. 8 having a radius OC′ by moving the plates from their positions of Fig. 9 to their positions of Fig. 7.

In order to avoid possible confusion of the observer as to which circle is to be used for stadia measurement it is desired that all but the proper one of the series of concentric circles be masked out; the plate 22 does this. It will be observed by reference to Fig. 9 that the radial slot 47a of plate 22 passes through the point of intersection C of spiral slots 48a and 46c, and that likewise its companionate radial slots pass through the other points of intersection of the spiral lines 46 and 48 which define the stadia circle of Fig. 10, but that all other points of intersection between the slots 46 and 48 will be masked out; thus, the points of intersection A, B and D between the slot 48a and the slots 46a, 46b and 46d will be masked out, and so also will all other unwanted points of intersection.

When the plates 21 and 23 are angularly adjusted with relation to each other, say by rotating plate 21 counterclockwise from its position of Fig. 9 to its position of Fig. 7, the plate 22 by virtue of the fact that it moves through one-half the angle of divergence between the plates 21 and 23 will move its radial line 47a to always pass through the point of intersection C, C′ between the spiral slots 48a and 46c; and again all the points of intersection between the spiral slots 46 and 48 will be masked out except those lying in the circle whose radius is OC′. In this way, only one circle of dots appears in the observer's field of view and its diameter may be varied by rotating the two plates 21 and 23 relatively to each other.

The arrangement of plates shown in Fig. 11 corresponds to a setting for a larger target size, the dimensions of this target being twice that set in Figs. 7 and 9. It will be observed that in Fig. 11 the slots 48 intersect the slots 46 and 47 at points lying on a circle whose radius is OC″.

As pointed out above, in the embodiment of the invention illustrated in the drawings, the spiral slots 46 and 48 have identically the same curvature. Moreover, they are logarithmic spirals. The plate 23 having the slots 48 is adjusted by knob 42 in accordance with the logarithm range; while the plate 21 having slots 46 is adjusted by knob 37 in accordance with the logarithm of target size. To assist the observer in making the latter adjustment, the plate 21 is calibrated in terms of target size in feet, for example, wing span in feet, and is provided with scale slots 52 to indicate the calibration. The scale 52 is matched against a fixed reference index 53 in the form of a triangular slot formed in the fixed plate 24. The plate 24 is provided with a flange 54 which masks out the major portion of the scale 52, only the indicia of this scale adjacent the index 53 being exposed; this range of the scale is exposed by a notch 55 formed in the flange 54. This notch 55 aligns with elongated slots 56 and 57 formed in the plates 22 and 23 respectively, and the plate 21 is provided with an elongated slot 58 which is aligned with the fixed index 53.

In view of the foregoing, it will be understood that there will be projected into the line of sight of the observer figures which indicate the target size matched against an image of the index 53, all as shown in Figs. 8, 9 and 10.

The theory of operation may be better understood by reference to Figs. 13 and 14. The stadia ring of dots B (Fig. 13), which spans the outer tips of the target, has radius $\rho$. The known wing span is D. Therefore:

$$\frac{R}{r} = \frac{D}{2\rho}$$

or $$\frac{2R}{r} = \frac{D}{\rho}$$

Let $$K_1 = \frac{2}{r}$$

Then $$K_1 R = \frac{D}{\rho}$$

or $$\log K_1 R = \log D - \log \rho$$

Now referring to Fig. 14; the slots 46, 47 and 48 intersect at point P which lies in a circle of radius $\rho$. As the curvature of the slots 46 and 48 are equal, the point of intersection P will occur along a line bisecting the angle $\phi_1 + \phi_2$ which makes the angle $\theta_1 = \theta_2$ (the line O—X being an arbitrary reference line). As slot 47 of disk 22 always bisects the angle $\phi_1 + \phi_2$, which is the angle of divergence between disks 22 and 23, then:

$$\phi_1 + \phi_2 = \theta_1 + \theta_2 = 2\theta$$

or $$\phi_1 = 2\theta - \phi_2$$

Now let $$\phi_1 = \log K_1 R$$

$$\phi_2 = \log \frac{1}{D}$$

$$2\theta = \log \frac{1}{\rho}$$

Then the above equation $\phi_1 = 2\theta - \phi_2$ becomes $$\log K_1 R = \log D - \log \rho$$

which is the desired relationship.

Therefore, if disk 21 is rotated an amount equal to log of $$\frac{1}{D}$$

and disk 23 is rotated until points P occur at a radius $\rho$ which spans the target, then rotation of disk 23 is equal to the $\log K_1 R$.

In using this apparatus, the observer first determines by recognition of the target the proper set of the plate 21 to be used in the range determination; this, as pointed out previously, is effected by setting the knob 37. The observer then views the target through the transparent member 10 and sees reflected in the line of sight an image of a luminous stadia figure comprising a plurality of points arranged in the form of a circle and a luminous dot at the center of the circle, as pointed out above. This observed image appears to be at an infinite distance and since it is superimposed upon the line of sight by the reflector 14 on the transparent member 10, it appears effectively coincident with the target. The diameter of this circle may be varied by rotating the knob 42 which rotates the range plate 23. The knob 42 is adjusted by the observer until two diametrically opposite points of the stadia circle are superimposed upon the outermost extremities of a dimension of the target, such as the wing span of the aircraft shown in Figs. 8, 10 and 12. This movement of the range plate automatically determines the range of the target, and its movement may be utilized in auxiliary equipment indicated by the numeral 59 driven by the shaft 39.

While in the specific embodiment of the invention illustrated in the drawings, the spiral lines 46 and 48 of the two plates 21 and 23 have the same curvature, they may have different curvatures. In case they do, the masking plate 22 would not be driven at half the speeds of the plates 21 and 23, but it would be geared to them so as to be driven at some multiple which would be satisfactory to cause its radial light-conducting portions always to pass through the proper points of intersection of the light-conducting portions 46 and 48 of the other plates.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. In an optical sighting device, a transparent member through which a target may be observed, a light-projecting system for producing a virtual image of a variable sized stadia figure in the line of sight of the observer by reflecting an image of said figure on said member, said system comprising a source of light, a collimator, a pair of superimposed opaque masking plates disposed between said source of light and said transparent member and located in approximately the focal plane of said collimator, said masking plates having a series of light-conducting portions arranged to intersect and thereby produce a luminous stadia figure, the proportions of which may be varied by relative movement of said masking plates, means for rotating one of said plates in accordance with the known dimensions of said target, and means for rotating the other of said plates to vary said proportions of said stadia figure to cause said stadia figure to coincide with said target and thereby determine the range of said target.

2. In an optical sighting device, a transparent member through which a target may be observed, a light-projecting system for producing a virtual image of a variable sized stadia figure in the line of sight of the observer by reflecting an image of said figure on said member, said system comprising a source of light, a collimator, a pair of superimposed opaque masking plates disposed between said source of light and said transparent member and located in approximately the focal plane of said collimator, said masking plates having series of spaced curved light-conducting portions, respectively, which are conjugate in pairs, a third superimposed opaque plate having a series of radially-extending light-conducting portions, means for independently rotating each of said first two plates, and means for rotating said third plate responsively to rotation of either of said first two plates so that the third plate always takes the same predetermined angular relationship to the other two plates, irrespective of the angular divergence between them, said various light-conducting portions being arranged so that a luminous stadia figure comprising a plurality of points of light arranged in a circle is produced at the intersections of the light conducting portions of said plates, the diameter of said stadia figure being variable by a relative rotation of said first two plates.

3. In an optical sighting device, a transparent member through which a target may be observed, a light projecting system for producing a virtual image of a variable sized stadia figure in the line of sight of the observer by reflecting an image of said figure on said member, said system comprising a source of light, a collimator, a pair of superimposed opaque masking plates disposed between said source of light and said transparent member and located in approximately the focal plane of said collimator, said masking plates having series of logarithmic light-conducting curves which are conjugate in pairs and intersect each other at a plurality of points arranged in concentric circles, means for rotating one of said plates in accordance with the logarithm of the known dimensions of said target, means for rotating the other in accordance with the logarithm of the target range, a third superimposed opaque plate having a series of radially extending light-conducting portions which intersect the curved light-conducting portions of said first two plates through their points of intersection in a predetermined one only of said concentric circles, the remainder of said circles being masked out by said third plate, and means for driving said third plate so that its said radial portions always bisect the angle of divergence between said first two plates.

4. Stadia-generating apparatus comprising a pair of superimposed opaque plates, one of said plates being provided with a series of spaced logarithmic curved light-conducting portions that are calibrated to known target size, and the other plate being provided with an equal number of spaced logarithmic curved portions that are calibrated to target range, the latter portions being conjugate in pairs with the first-named series of light-conducting portions and intersecting them so as to produce a series of light-conducting points, and means for setting said one plate in accordance with known target size and the other in accordance with target range.

5. Stadia-generating apparatus comprising three superimposed opaque plates, two of said plates having series of identically-shaped logarithmic spiral light-conducting portions arranged conjugate in pairs so that they intersect at a plurality of series of spaced points arranged in concentric circles, means for rotating one of said two plates in accordance with the logarithm of known target size and the other plate in accordance with the logarithm of target range in order to vary the diameters of said circles, the third of said plates being provided with straight radial light-conducting portions that pass through the points of intersection of said spiral light-conducting portions that lie in a predetermined one of said concentric circles, and means for operating said third plate through one-half the angle of divergence between said two plates so that said radial portions always pass through said lines of intersection of said predetermined circle, irrespective of the adjustments of said two plates, the remainder of said circles being masked out by said third plate.

DAN L. COLBATH.